United States Patent Office 3,035,155
Patented May 15, 1962

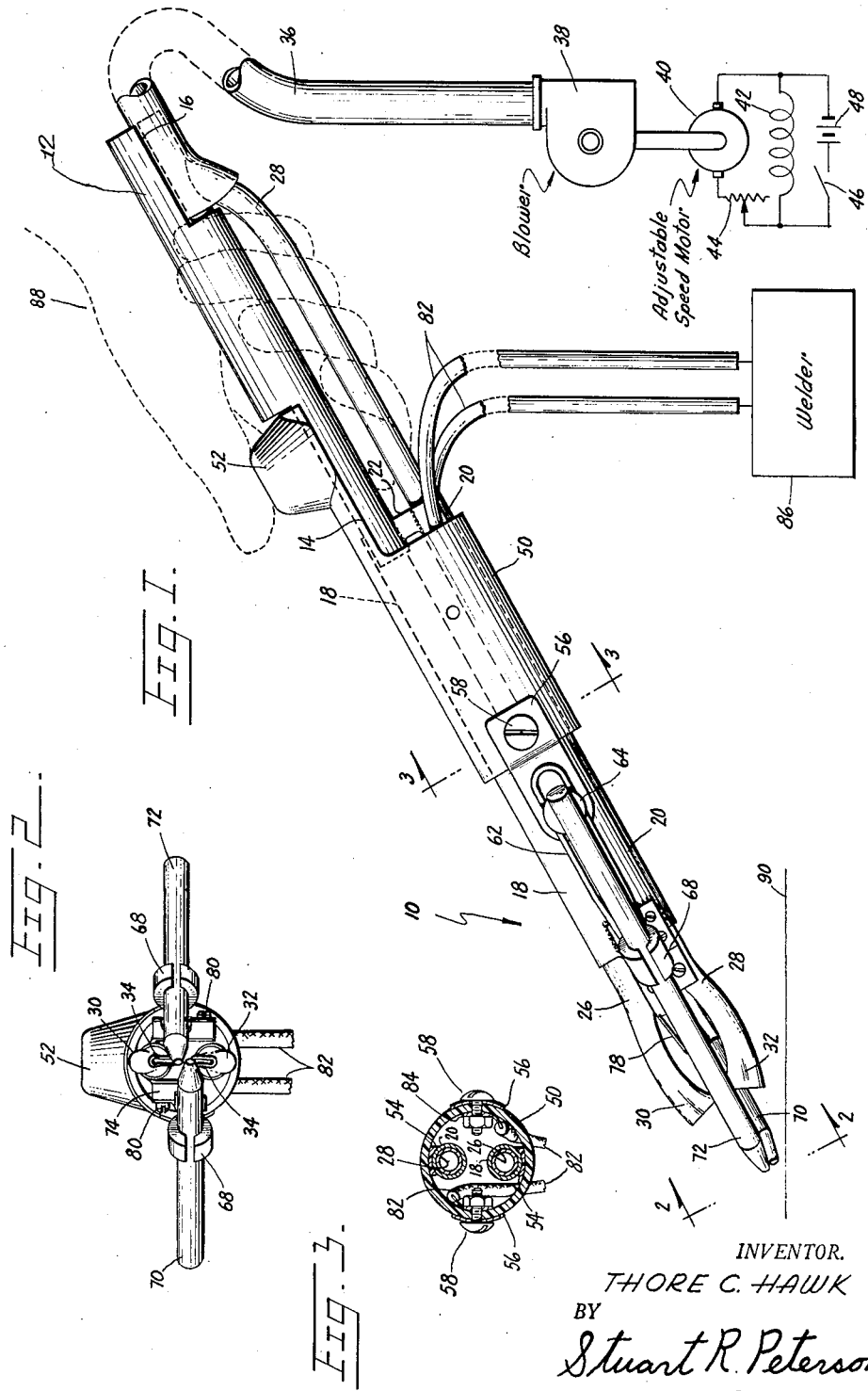

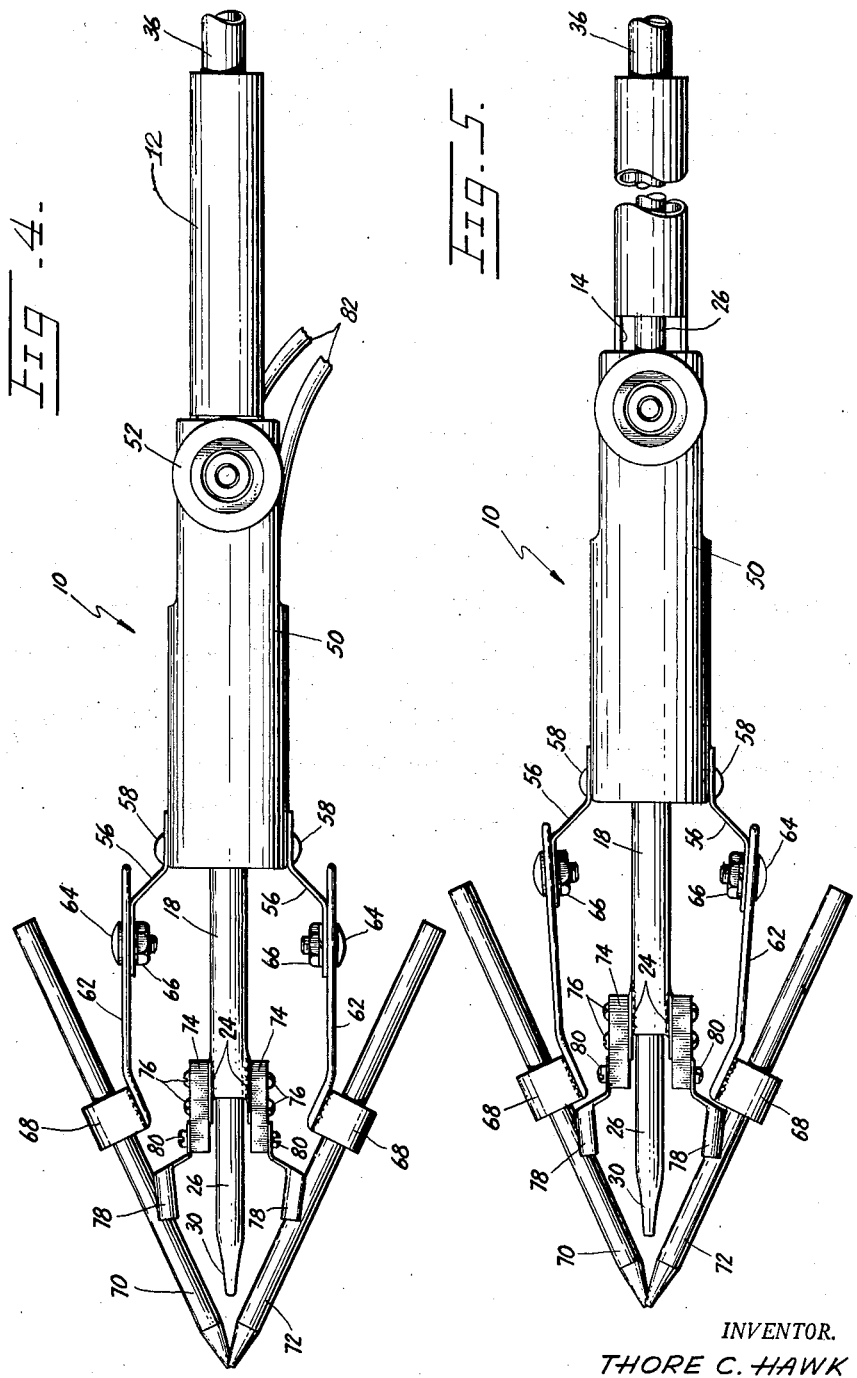

3,035,155
WELDING TORCH
Thore C. Hawk, 425 W. 3rd St., Rugby, N. Dak.
Filed Apr. 8, 1960, Ser. No. 20,999
9 Claims. (Cl. 219—75)

This invention relates generally to carbon arc welding and pertains more particularly to an improved twin carbon welding torch having an air supply associated therewith.

One important object of the invention is to provide sufficient oxygen for combining with the carbon from the electrodes that would otherwise mix with the weld metal and produce an inferior weld due to this carbon impurity. In other words, the invention has for an aim the marked reduction of carburization that would otherwise take place. A welding torch of the envisaged construction will also find utility in brazing, as well as in welding, inasmuch as in the usual type of brazing the carbon coming from the electrodes provides a layer overlying the parent metal. If not substantially removed, the deposited filler would in this latter situation be deposited over the carbon. Therefore, the general purpose of the invention is to remove all objectionable quantities of carbon, this being done by furnishing enough oxygen so as to form carbon monoxide and/or carbon dioxide.

In achieving the foregoing general object, the invention has for an aim the complete enveloping of the tips of the carbon electrodes with air rather than only portions thereof. In other words, the present invention contemplates the enclosing of all sides of the carbon electrodes with sufficient air so as to produce a more effective removal of carbon.

Another object of the invention is to provide a more stabilized arc. The enhanced stabilization stems from the fact that the air stream produced with a welding torch constructed in accordance with the teachings of the present invention "stiffens" the arc. This is by reason of the more uniform air density that results compared with welding with just the ambient air present at normal pressures. The construction of my torch makes certain that the flow of air is in the proper direction for achieving the increased stabilization.

Another important object of the invention is to provide a welding torch in which continuous adjustability is available for compensating for the carbon electrode consumption, the adjustable feature permitting the tips of the electrodes to remain in substantially the same physical relationship with the air discharge nozzles while the electrodes are being consumed.

Also, the invention has for an object the automatic cooling of the electrodes when achieving the foregoing desiderata.

Yet another object of the invention is to provide a twin carbon welding torch or electrode holder which will permit the welding or brazing of lightweight work. Trouble has been experienced in the past with the welding or brazing of thin stock with carbon electrodes. Consequently, resort has instead been made to gas welding techniques; however, the use of carbon arc welding and brazing is less expensive than using gas for these particular ends. Therefore, if high quality work can be performed, which is the case when employing the teachings of the present invention, the use of carbon arc procedures have a decided advantage from a cost standpoint.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIGURE 1 is a side elevational view depicting my welding torch as it would appear in actual use, certain auxiliary equipment being shown schematically in association therewith;

FIGURE 2 is an end view of the device taken in the direction of line 2—2 of FIGURE 1;

FIGURE 3 is a sectional view taken in the direction of line 3—3 of FIGURE 1;

FIGURE 4 is a plan view corresponding to FIGURE 1, and

FIGURE 5 is a plan view similar to FIGURE 4 but showing the welding torch after a certain amount of carbon electrode consumption has taken place.

The welding torch exemplifying the present invention has been designated in its entirety by the reference numeral 10. This torch 10 includes a generally cylindrical handle 12 having a forwardly disposed cutout section labeled 14 and a rearwardly disposed cutout section labeled 16. Also included as part of the torch 10 is a pair of sleeve bearings 18, 20. It will be observed that a spacing bracket 22 is fixedly positioned between the forward end of the handle 12 and the rear end of the bearing 20. While not readily discernible from the drawings, it can be explained that the rear end of the sleeve bearing 18 is brazed to the forward end of the cylindrical handle 12. While this arrangement is employed for maintaining the desired degree of separation of the sleeve bearings 18, 20 at their rear ends, it can be pointed out that the forward ends are maintained in the same spaced relationship by a pair of spacing plates 24. These spacing plates 24 also serve another purpose which will be described hereinafter. However, it will be appreciated that the sleeve bearings 18, 20 are maintained in parallelism through the respective spacing arrangement at each end.

Through the sleeve bearing 18 extends a first air tube 26 of metal and through the other sleeve bearing 20 extends a second air tube 28 of metal also. The forward end of the tube 26 terminates in a nozzle 30, whereas the forward end of the second tube 28 similarly terminates in a second nozzle denoted by the numeral 32. As best viewed in FIGURE 2, it can there be seen that these nozzles converge toward each other and have elongated discharge openings 34 residing in the same general plane. More will be said later on concerning the role played by these nozzles. From FIGURE 1 it will be discerned that the two air tubes 26, 28 merge into a single flexible tube 36 at their rear ends. This tube 36 connects with the discharge side of a blower 38. The blower 38 is driven by an adjustable speed motor 40 having a field 42 and a rheostat 44 by which the energization of the motor can be changed in order to adjust the speed thereof. Through the agency of a switch 46 in circuit with a battery 48, electric power is supplied to the motor 40 for the operation of the blower 38.

At this time attention is called to the utilization of an electrical insulating sleeve 50 which encircles both of the sleeve bearings 18, 20. For the purpose of manipulating the sleeve 50, an adjusting knob or button 52 is carried thereon. The sleeve 50 is constrained for reciprocal movement with respect to the sleeve bearings 18, 20 by virtue of a pair of grooved guides 54, these guides 54 extending longitudinally of the sleeve 50 and being adhered or otherwise fixedly anchored therein at diametrical locations.

At the forward end of the sleeve 50 is a pair of resilient leaf springs 56, these leaf springs being mounted on the sleeve 50 through the medium of screws 58. While these leaf springs diverge outwardly with respect to each other, nonetheless there is imparted to them an inward biasing action derived from their resiliency. The reason for this biasing action will soon become clearer. Carried at the free ends of the leaf springs 56 are reversely bent wire arms 62, these wire arms providing a slot through each of which a bolt 64 extends and which bolt carries a nut 66 in each instance. It will be understood that the arms 62 can be adjusted longitudinally with respect to the sleeve 50 through this arrangement. The purpose of the arms 62 is to carry a pair of split collars 68 which serve as holders for a pair of rod-like carbon electrodes 70, 72. The converging carbon electrodes 70, 72 are conventional, and as such may be copper clad and of the cored variety for enhanced arc stabilization, although uncored rods can be utilized with the present invention.

It will be recalled that it was previously mentioned that the spacing plates 34 acted in an additional capacity over and above their spacing function. At this time, it is to be pointed out that an insulating block or pad 74 is secured to each of these plates 24, as by screws 76. The blocks 74 in turn carry trough-shaped guides 78, there being a guide on each block. The guides may be attached by means of screws 80. It will, however, be discerned that the guides actually converge towards each other and toward the general plane in which the discharge openings 34 of the nozzles 30, 32 reside.

In addition to being resilient, the leaf springs 56 are of metallic construction so as to be electrically conductive. It is through these leaf springs 56 that current is furnished to the carbon electrodes 70, 72. To supply electric power to the leaf springs 56, though, a pair of flexible conductors 82 are employed, these flexible conductors extending to a conventional welding machine designated by the numeral 84.

Having presented the foregoing information, the use of my welding torch 10 should be readily understood. However, a brief description of the manner in which my torch is actually used will perhaps be of added assistance. Accordingly, when it is desired to use the torch, one holds it as illustrated in FIGURE 1, a person's hand 88 being depicted in phantom outline. As is normally done, the electrodes 70, 72 are struck against a carbon block (not shown) in order to establish an arc between the two electrodes. With the arc established, one is ready to weld. In this regard, the upper surface of a piece of work 90 is pictured in FIGURE 1 in order to give the reader some idea as to the angle at which the device 10 is held when conducting a welding operation.

If the user is not acquainted with the welding torch 10, he will experiment with various amounts of air flow. Accordingly, assuming that the user is employing the device 10 for the first time, he will close the switch 46 and will set the rheostat 44 for a relatively low amount of air flow. In other words, the motor will be run relatively slow at the outset. After experimenting, the user will become accustomed to the approximate setting of the rheostat 44 for the type of welding that is to be performed. Although it is highly desirable to have sufficient air directed outwardly via the nozzles 30, 32, nonetheless one must exercise some care that the air flow is not so strong as to blow the molten weld metal.

It might also be explained that one usually holds a filler rod (not shown) for providing the weld metal that is to be deposited. However, in some instances the work 90 will provide the filler material itself. With the arc established and the proper amount of air flow, one is ready to perform a high quality weld. This is easily done with the torch 10 of the present construction, for the air being discharged through the openings 34 completely envelops the tips of the electrodes 70, 72. As can be seen from FIGURE 2, the electrode tips actually reside in substantially the same plane in which the openings 34 are disposed. Also from this figure, that is FIGURE 2, it will be discerned that the electrode tips lie between the nozzles 30, 32, although as readily seen from FIGURE 1 these electrodes 70, 72 have their tips at forwardly spaced loci from the discharge openings 74 in the nozzles 70, 72. Stated somewhat differently, the nozzle openings 34 are disposed to either side of the center line. The tip of the electrode 70 is offset toward the opening 34 of the nozzle 32, whereas the tip of the electrode 72 is offset toward the opening 34 of the other nozzle 30, the offset of said tips being of a lesser degree relative to the center line than that of said outlet openings. The point to be emphasized, however, is that the air being discharged from the nozzles 30, 32 is directed about the electrodes, and in particular their tips which tips are of course sustaining the electric arc.

As can be seen from FIGURE 1, the welder normally places the thumb of his hand 86 on the adjusting knob 52. In this manner, the welder can manually slide the sleeve 50 forwardly so as to advance the carbon electrodes 70, 72 as they are consumed. The express purpose of FIGURE 5 is to show the position of the knob 52 after the electrodes 70, 72 have been consumed to some extent. It will be noted that the cutout portion labeled 14 is now visible in FIGURE 5 whereas such a portion was not visible in FIGURE 4 because of the portion of the sleeve 50 that overhung the cutout portion 14. It is very important to observe that the biasing action of the leaf springs 56 is such as to urge the electrodes 70, 72 against their respective trough-shaped guides 78 at all times. Through such an arrangement, the electrode tips will always assume substantially the same position in which they appear in FIGURE 2. It might be explained, although rather obvious, that initially the carbon electrodes 70, 72 are considerably longer than the length thereof depicted in the drawings. Shorter electrodes have been pictured in order not to conceal any more of the torch 10 in FIGURE 1 than is necessary. Owing to the split configuration of the collar 68, after a considerable degree of consumption has occurred, the welding procedure can be momentarily stopped while the electrodes 70, 72 are advanced a considerable distance in their respective holders or collars 68. However, controlled adjustment between such large incremental changes is always available to the user during the welding procedure, this being without having to stop the welding operation except after a considerable amount of time has elapsed.

From what has been said herein it can be readily appreciated that very little carburization is produced in the weld, and at the same time the applicant is able to provide a lightweight, compact, and durable torch. Because of this, the torch can be easily manipulated, yet the additional advantage of preventing undesired carbon from entering into the weld is effectively achieved.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A welding torch comprising a pair of converging nozzles having outlet openings for discharging a gas into a welding zone, and means for supporting a pair of carbon electrodes, means for advancing said supporting means, and means for guiding said electrodes during the advancing of said supporting means so that said electrodes converge toward each other from opposite sides of said nozzles to a locus ahead of said outlet openings and substantially therebetween.

2. A welding torch comprising a pair of converging nozzles having outlet openings offset to either side of a center line extending therebetween for discharging gas into a welding zone, and means for advancing the tips of a pair of elongated carbon electrodes into said zone ahead of said outlet openings, said means constraining said electrodes so that the tip of one electrode is offset toward one nozzle with respect to said center line and the other of said electrodes being offset toward the other nozzle, the offset of said tips being of a lesser degree relative to said center line than that of said outlet openings.

3. A welding torch comprising a pair of laterally spaced nozzles having elongated discharge openings residing generally in the same plane, and means for supporting a pair of carbon electrodes so that the tips thereof reside substantially in said plane and at forwardly spaced locations intermediate said discharge openings.

4. A welding torch in accordance with claim 3 in which said supporting means is slidably mounted for advancing said carbon electrodes to compensate for their consumption.

5. A welding torch in accordance with claim 4 including means for guiding said electrodes during said advancing so that their tips will continue to reside in substantially the same physical relation with respect to said nozzle openings.

6. A welding torch comprising a pair of air nozzles residing in a given plane, a pair of holders for holding a pair of rod-like carbon electrodes, a guide element fixedly disposed at either side of said plane, a reciprocable member mounted for slidable movement toward and away from said nozzles, and resilient means carried by said member for supporting said holders and biasing them in a direction to cause the carbon electrodes to slidably bear against said guide elements as said member is advanced to compensate for their consumption.

7. A welding torch in accordance with claim 6 in which said guide elements are trough-shaped and converge toward the plane of said nozzles.

8. A welding torch comprising a pair of parallel air tubes each having a discharge nozzle at one end, a sleeve member slidably encircling said air tubes, a pair of carbon holders carried by said sleeve member and movable in unison therewith, whereby said sleeve can be initially positioned so that the tips of the carbon electrodes supported in said holder will be enveloped by air discharged via said nozzles and whereby said sleeve may thereafter be movably advanced to compensate for the consumption of said carbon electrodes.

9. A welding torch in accordance with claim 8 including a sleeve bearing circumjacent each air tube, and a longitudinally grooved guide for each bearing, said guides being fixedly located within said sleeve member so as to constrain said sleeve member for reciprocable movement with respect to said sleeve bearings and said air tubes to permit the advancement of said sleeve member when compensating for said electrode consumption.

References Cited in the file of this patent

UNITED STATES PATENTS

| | | |
|---|---|---|
| 1,850,172 | Holslag et al. | Mar. 22, 1932 |
| 1,866,044 | Krebs | July 5, 1932 |